Aug. 2, 1932.                C. A. RAMSEY                    1,869,822
                       CHANGE MECHANISM FOR LOOMS
                    Filed May 15, 1931      2 Sheets-Sheet 2
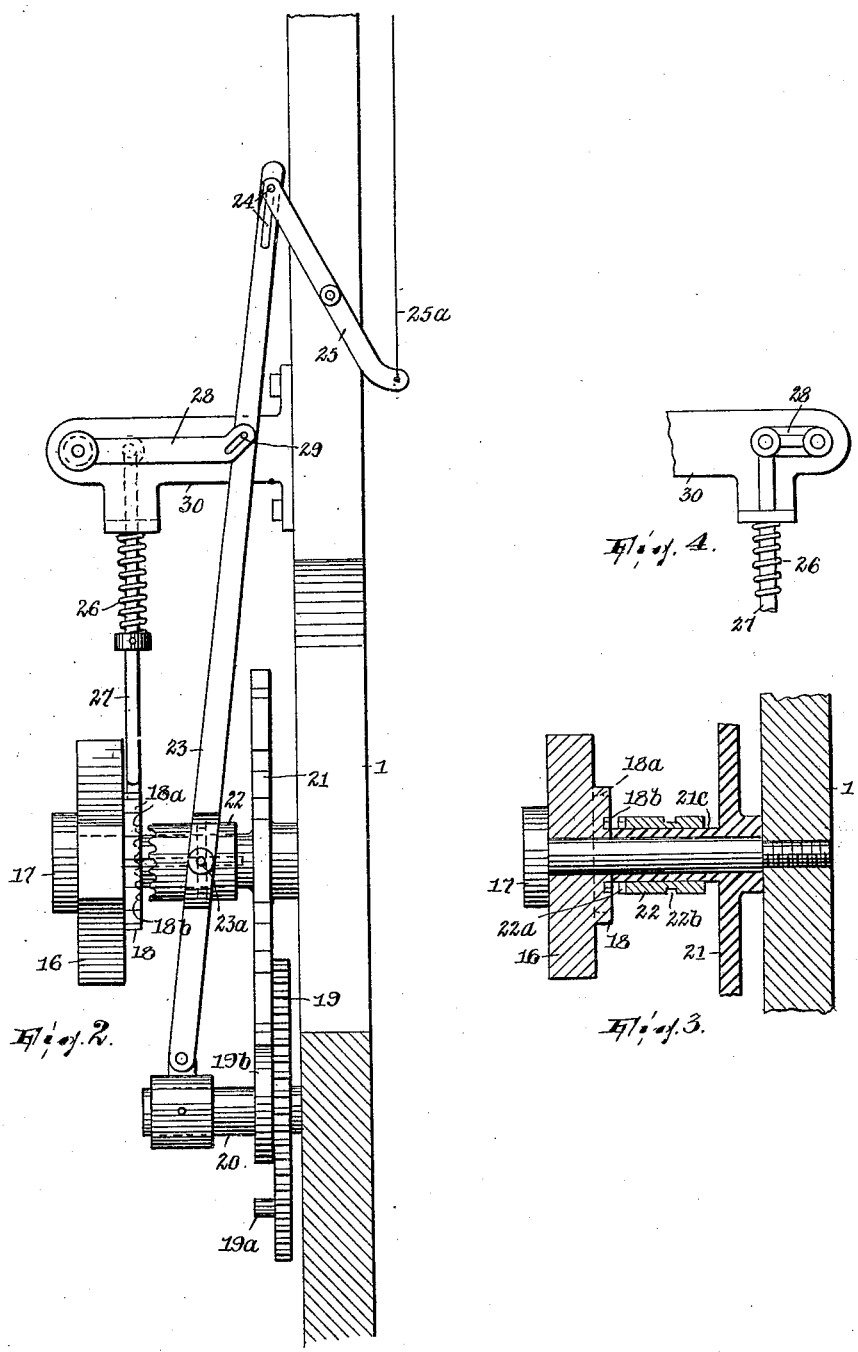
INVENTOR,
Charles A. Ramsey.
BY his ATTORNEY Patented Aug. 2, 1932

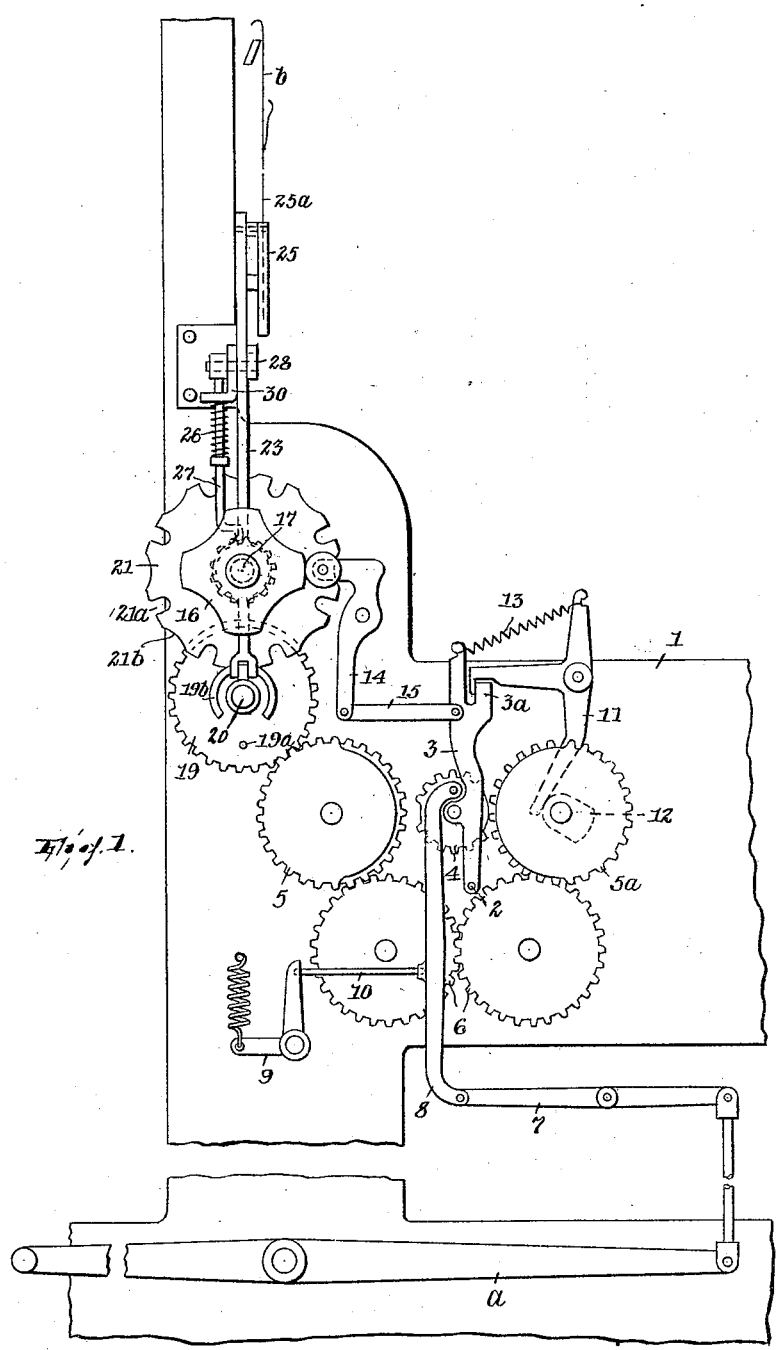

1,869,822

UNITED STATES PATENT OFFICE

CHARLES A. RAMSEY, OF PATERSON, NEW JERSEY

CHANGE MECHANISM FOR LOOMS

Application filed May 15, 1931. Serial No. 537,513.

This invention relates to looms and particularly to systems employed in certain looms to change the position of some structure subject to control derived from a jacquard or equivalent pattern means: For instance, in a narrow-ware loom having two or more banks of shuttles it is known to provide mechanism to shift the shuttle-banks so as to bring any one into operative position for weaving, as in the Schaum Patent No. 786,237; in some cases, other structure is shifted, as the boxes in a box-loom.

In these systems the structure to be moved is operated by a so-called change-motion mechanism. This mechanism comprises a mutilated gear to which said structure is connected at an eccentric point thereof and which is journaled in a support movable so as to bring said gear into mesh with one or the other of two mutilated and constantly and reversely rotated master gears between which it is arranged, so that one is adapted to rotate the first or vibrator gear a half turn in one direction to shift said structure one way and the other is adapted to rotate the vibrator gear a half turn in the other direction to shift said structure back. And this mechanism is controlled, to wit, said support is moved back and forth, by the cam of an indicator mechanism. This cam of the indicator mechanism has heretofore been moved a step at a time (to cause a salient or a recess thereof to be in active position), subject to the control of the jacquard or equivalent of the loom, by equipping it with a ratchet and causing a constantly reciprocated pawl to shift pivotally into engagement with the ratchet whenever a "call" came from the jacquard. This construction is found to be faulty in that the always reciprocating motion of the pawl causes it sometimes to produce, without a "call" from the jacquard, the actuation of the cam and hence of said support, so that the change-motion mechanism would be actuated when not intended. The system was therefore unreliable.

According to this invention, the change-motion mechanism is or may be substantially the same as heretofore; but instead of the indicator mechanism comprising a pawl and ratchet I utilize a one-direction intermittent rotary motion (as of the Geneva type), and between the driven intermittently moved element thereof and the cam I provide means to clutch them together which is controlled from the jacquard. The result is that the "calling" of the cam occurs only and always as predetermined by the jacquard and in general there is increased efficiency.

In the drawings,

Fig. 1 is a side elevation of the improved system;

Fig. 2 is an elevation as seen from the right in Fig. 1 and showing the mentioned cam, stop motion, clutch and certain other parts;

Fig. 3 is a sectional view of the cam, the driven member of the stop motion and the clutch, taken axially thereof; and Fig. 4 shows certain parts in Fig. 2 from the side opposite to that appearing in the latter figure.

In a frame 1 is fulcrumed at 2 the upright vibrator lever 3 forming the mentioned support for the intermediate mutilated vibrator gear 4 shiftable with said support into position to engage either of the two other mutilated master gears 5 and 5a of which 5 may be taken as the driver, constantly rotating and constantly driving gear 5a through intermeshing idler gears 6 which mesh with the unmutilated toothed peripheries of the gears 5, 5a. Let a here represent the structure to be moved, it actually being connected to move with the shuttle banks or other part or structure (not shown) of the loom which require to be shifted back and forth whenever called by pattern mechanism of the loom. This structure a may be connected to a lever 7 which in turn is connected with an eccentric point of vibrator gear 4 by a link 8 which at its upper end, when the gear 4 is moved one way or the other, abuts (here) the support 3 as a stop, being normally urged against said support by the spring actuated lever 9 acting thereon through push-rod 10. 11 is the holding pawl which in every revolution of gear 5a is moved by a cam 12 thereon to free the support 3 to permit its shifting and when it returns holds said support against shifting, to wit, according as the pawl dogs one side or the other of a lug 3a on the support, a spring 13 connecting the pawl and support so as to press the former against said cam and normally urge the support to the right. 14 is the usual lever linked at 15 with the support 3 and having a roller to bear on the cam 16 having four rises and four falls, as usual.

This cam forms a part of the indicator mechanism and is journaled on the stud 17. I form it with a hub 18 which is peripherally notched, at 18a, and at its face has a circular series of notches 18b, the latter giving it the character of a clutch-member.

The gear 5 is made to drive the gear-like driving member 19 of a one direction rotary intermittent motion, said member being journaled on a stud 20 and having an eccentric pin 19a and a mutilated flange 19b whose space or mutilation is radially opposed to the pin. This stop-motion is here substantially of the conventional Geneva type, its driven member 21, journaled on stud 17, being a star-wheel whose notches 21a are adapted to receive pin 19a and intervening recesses 21b are adapted to receive flange 19b, so that 19 and 21 are in effect intergeared. Said driven member has an axial sleeve 21c spacing cam 16 therefrom. On the sleeve and splined thereto is a clutch-member 22 having end teeth 22a to engage the notches 18b in the cam 16 and also a peripheral groove 22b. This groove receives pins 23a on a lever 23 fulcrumed in a collar on stud 20 and having a slot-and-pin connection 24 with a lever 25 adapted to be connected with some pattern-called part of a jacquard or the like machine (as one of the hooks b of such jacquard), by a wire 25a. The lever 23 is here normally held in the (de-clutching) position shown by a spring 26 which acts to depress a push-rod 27 and therefore a lever 28 having a slot-and-pin connection 29 with lever 23, 30 being a bracket in which lever 28 is fulcrumed and between which and the push-rod the spring is interposed. The spring normally holds the push-rod depressed so that it engages in one of the notches 18a of cam 18.

Operation: Gears 5, 6, 5a and 19 are constantly rotated, with gear 5 as the driver. Whenever the support 3 is caused to shift vibrator gear 4 to right or left into engagement with one or the other of the master gears 5, 5a gear 4 will be turned a half-revolution one way or the other and come to a dwell, this being due to its having only one tooth omitted at one side but more than one at the other, as usual; this will cause the structure a to move up or down, through 7 and 8. Incidentally, whenever the support 3 is to shift it is released by the action of cam 12 on pawl 11 and thereupon again locked by said pawl, as stated. So much is substantially the usual operation of this change-motion mechanism. Of course for each revolution of the driving member 19 of the stop-motion the driven member performs a partial revolution and is held at dwell. The cam 16 (which has the same number of working faces, or four rises and four falls, as there are notches 21a in the member 21) is adapted to partake of these partial revolutions whenever the jacquard calls the clutch member 22, or shifts it through parts 25a, 25 and 23 into clutching engagement with the cam; when the jacquard or equivalent ceases to act on the clutch to maintain the clutch-engagement (which in this example it is assumed to do on every pick, though not necessarily) spring 26 returns the clutch member. The calling and releasing actions of the jacquard also result, respectively, in releasing and relocking of the cam 16 by the push-rod or pawl 27.

Given a change-motion mechanism comprising, with back-and-forth shiftable vibrator means (as 3, 4, 14, 15) having a vibrator gear (4) to be rotated a partial revolution one way or the other by one or the other of two intergeared constantly rotated master gears when said means is shifted one way or the other, my invention contemplates an actuating member (21) rotating with said master gears intermittently, a rotative cam (16) to shift said means one way or the other, and means to releasably connect said member and cam for rotation together, the latter means being adapted to be controlled by the jacquard or other pattern means of the loom. In the example, this means is normally held in one of its clutching or de-clutching positions.

Without limiting myself to certain of the details shown and described, what I claim is:

1. In combination, with a change-motion mechanism comprising, with back-and-forth shiftable vibrator means having a vibrator gear to be rotated a partial revolution one way or the other and two intergeared constantly rotated master gears adapted, respectively, to rotate the vibrator gear one way or the other when the vibrator means is shifted one way or the other, an actuating member rotating with said master gears step by step in one direction, means to shift said vibrator means back and forth comprising a rotative cam, and means for releasably connecting said member and cam for rotation at times together.

2. In combination, with a change-motion mechanism comprising, with back-and-forth shiftable vibrator means having a vibrator gear to be rotated a partial revolution one way or the other and two intergeared constantly rotated master gears adapted, respectively, to rotate the vibrator gear one way or the other when the vibrator means is shifted one way or the other, an actuating member rotating with said master gears step by step in one direction, means to shift said vibrator means back and forth comprising a rotative cam, and means movable from one to the other of positions in one of which it connects said member and cam for rotation together and in the other of which they are disconnected, the last-named means being normally held in one of said positions.

3. In combination, with a change-motion mechanism comprising, with back-and-forth shiftable vibrator means having a vibrator gear to be rotated a partial revolution one way or the other and two intergeared constantly rotated master gears adapted, respectively, to rotate the vibrator gear one way or the other when the vibrator means is shifted one way or the other, an actuating member rotating with said master gears intermittently, a rotative cam journaled concentrically with said member, and a clutch shiftable to disconnectively connect said member and cam and splined to one and shiftable into and out of clutch-engagement with the other of them.

4. In combination, with a change-motion mechanism comprising, with back-and-forth shiftable vibrator means having a vibrator gear to be rotated a partial revolution one way or the other and two intergeared constantly rotated master gears adapted, respectively, to rotate the vibrator gear one way or the other when the vibrator means is shifted one way or the other, an actuating member rotating with said master gears intermittently, means to shift said vibrator means back and forth comprising a rotative cam, means shiftable into and out of rotation-preventing relation to the cam, and means, controlling the shifting of the last-named means, for releasably connecting said member and cam for rotation together.

In testimony whereof I affix my signature.

CHARLES A. RAMSEY.